Figure 7:
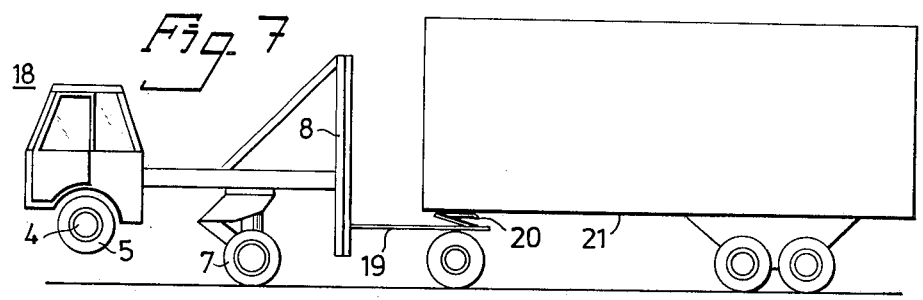

United States Patent [19]

Tenn

[11] 4,321,977
[45] Mar. 30, 1982

[54] HAULING VEHICLE

[76] Inventor: Bertil Tenn, Melbavagen 5, S-170 15 Stenhamra, Sweden

[21] Appl. No.: 135,366

[22] PCT Filed: Aug. 6, 1979

[86] PCT No.: PCT/SE79/00166
§ 371 Date: Mar. 31, 1980
§ 102(e) Date: Mar. 31, 1980

[87] PCT Pub. No.: WO80/00330
PCT Pub. Date: Mar. 6, 1980

[51] Int. Cl.³ .............. B60P 1/00; B62D 61/12; B65G 7/04
[52] U.S. Cl. .................. 180/12; 180/23; 414/458
[58] Field of Search ............ 180/23, 11, 12, 13, 180/24.02, 135; 280/43.12, 42, 423 A; 414/495, 458, 472

[56] References Cited

U.S. PATENT DOCUMENTS

| | | | |
|---|---|---|---|
| 1,155,713 | 10/1915 | Eldridge | 180/12 |
| 1,698,277 | 1/1929 | Ronning et al. | 180/11 |
| 2,425,948 | 8/1947 | Lucien | 180/11 |
| 2,623,653 | 12/1952 | Framhein | 280/43.12 X |
| 2,936,039 | 5/1960 | Rockwell | 180/135 |
| 3,392,857 | 7/1968 | Tantlinger | 280/415 R |
| 3,478,833 | 11/1969 | Breon et al. | 180/12 |
| 3,836,179 | 9/1974 | Jennings | 280/423 A |

FOREIGN PATENT DOCUMENTS

| | | | |
|---|---|---|---|
| 148620 | 1/1955 | Sweden. | |
| 357721 | 10/1971 | Sweden. | |
| 603805 | 6/1948 | United Kingdom | 180/13 |

Primary Examiner—John A. Pekar
Attorney, Agent, or Firm—Brown, Flick & Peckham

[57] ABSTRACT

A hauling vehicle in the form of a so-called terminal tractor intended for transporting containers, but which also can be used for transporting different kinds of trailers provided only with rear wheels, is two-axled and provided at its rear end with connecting means designed to provide essentially rigid interconnection of the vehicle frame with the front end of the container or trailer to be hauled. The rear wheels of the hauling vehicle are steerable as well as drivable from the driving motor of the vehicle. The rear axle is connected to the vehicle frame by means, e.g., hydraulic cylinders, enabling adjustment of the vertical position of the vehicle frame relative to the rear axle. After the rear end of the vehicle frame has been rigidly interconnected with the front end of the container, the vehicle frame can be raised relative to the rear axle, whereby the front end of the container is lifted up into the air. The distribution of the weight of the vehicle between its rear axle and its front axle is such that the front wheels of the vehicle are lifted up into the air. If the rear end of the container has been provided with a temporarily affixed wheel set, the hauling vehicle together with the container will form a drivable equipage whose drivable and steerable front wheels are the rear wheels of the hauling vehicle.

6 Claims, 10 Drawing Figures

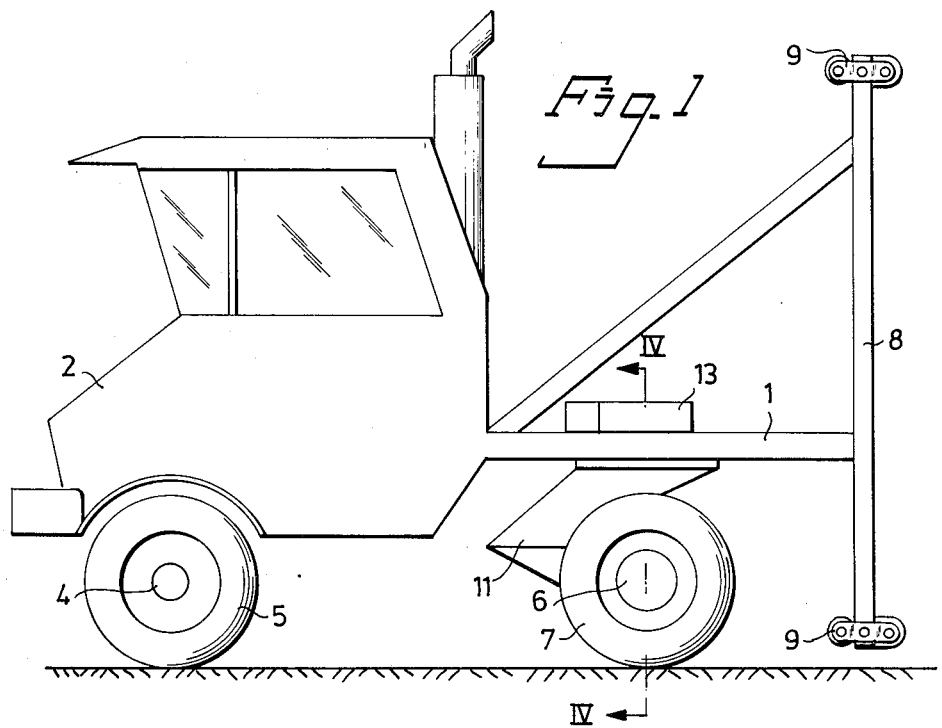
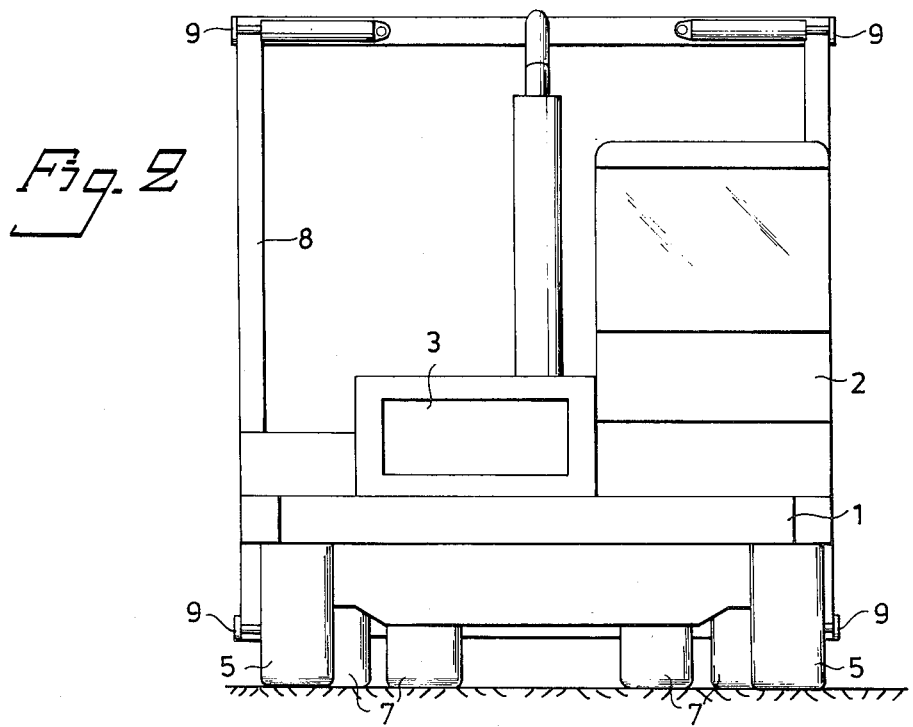

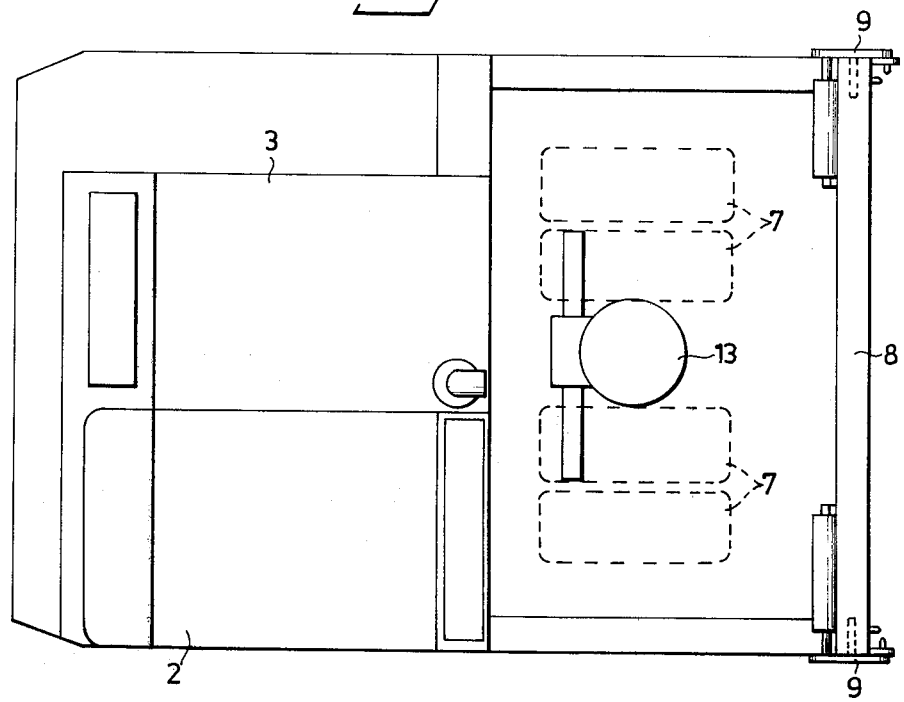
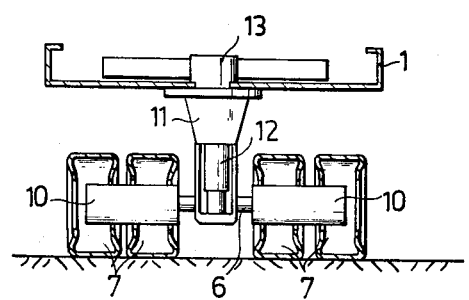

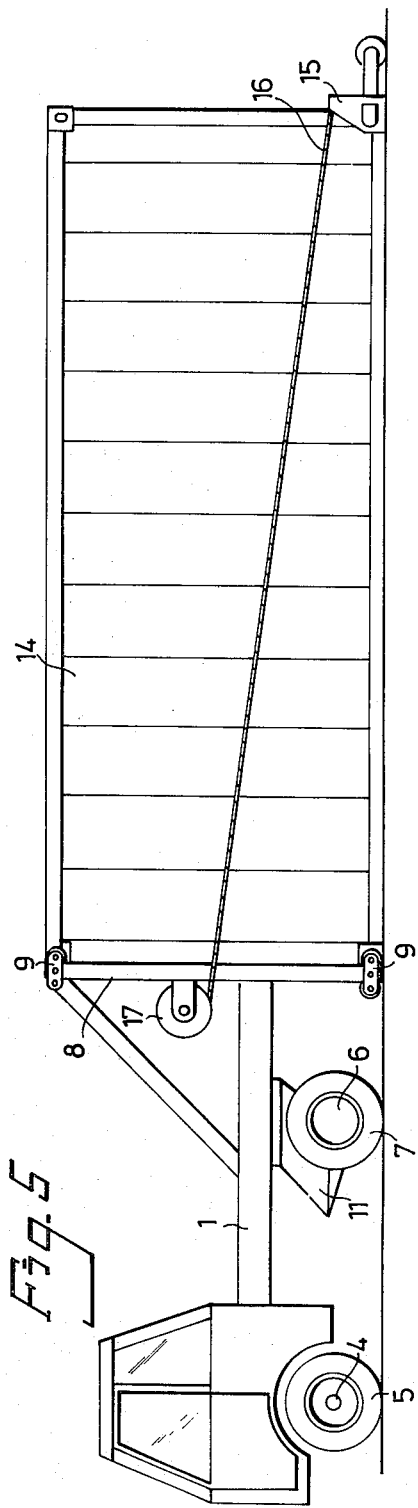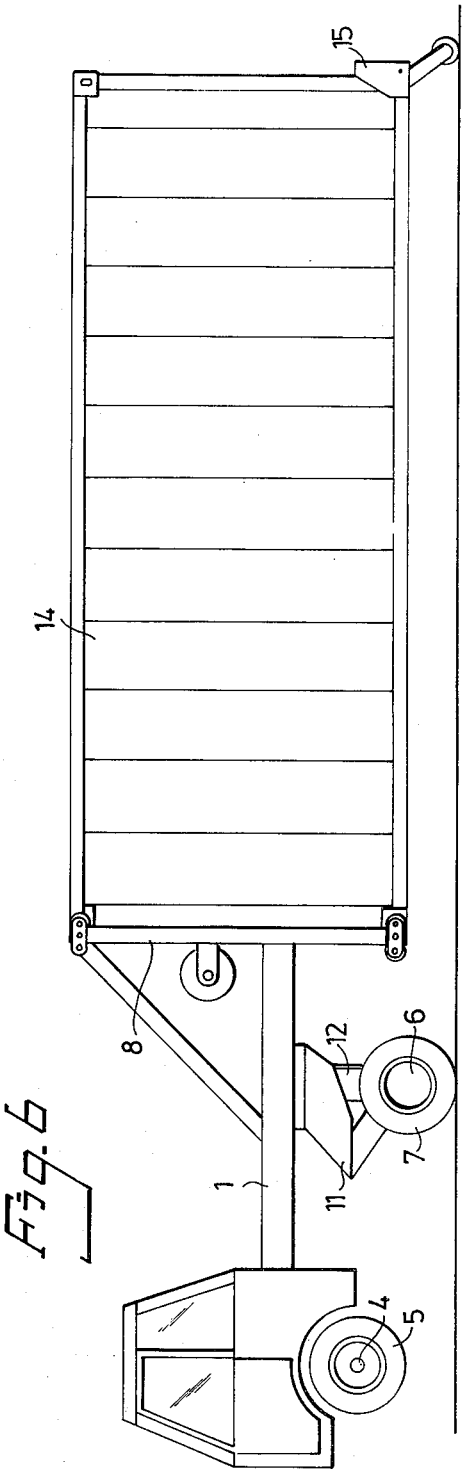

HAULING VEHICLE

The present invention relates to a hauling vehicle which particularly is intended for transporting containers but which also can be adapted to be used for many other purposes e.g. for transporting different kinds of trailers.

At harbours, airports, railroad stations, and all other kinds of goods stations there is a great need for simple and efficient devices for transporting containers which can have very large dimensions and large weight, e.g. a length of about 12 meters and a weight of about 30 tons. This transportation is to be carried out quickly, smoothly and with great accuracy also in narrow spaces as e.g. when loading and unloading ships.

A problem which to some extent is similar exists concerning trailers which are designed to be connected to separate hauling vehicles provided with a turntable but which upon transportation by means of ships are not accompanied by their associated hauling vehicles but have to be hauled by other auxiliary means upon loading and unloading as in general also upon other kinds of station transportation. For this purpose it is known to use short two-axled tractor-like hauling vehicles provided with a turntable lifting device so that they can be connected to trailers for transporting them shorter distances and with moderate velocity.

Of course, the same method can not quite easily be applied to the loading and unloading and other kinds of terminal transportation of containers which as we all known do not have any wheels of their own. In a known system for loading and unloading containers on ships as well as for other kinds of terminal transportation the containers are therefore placed on very low open-sided wagons, so called roll trailers, which are provided with wheels or rolls only at one end while the other end of the wagon is designed to be connected to and carried by the turntable lifting device on a terminal tractor of the above kind by means of a so called swanneck. Thus, the wagon and the container located thereon can be hauled by said tractor. However, such extra roll trailers for containers lead to an essentially increased capital cost for the transport system since the trailers have to accompany the containers during the whole transport on board the ship as well as to extra handling costs for loading and unloading the containers on these roll trailers.

For transporting containers it is, therefore, also known to use loose sets of wheels or rolling means which can be attached to the lower corner mountings on the container resting on an underlayer, and which have wheels which can be lowered by means of hydraulic cylinders or the like so that the container by lowering of the wheels can be lifted from the underlayer to a transport position in which the container can be hauled by a hauling vehicle which in a suitable manner is connected to the rolling means at one end of the container. However, these rolling means have to be designed in a special way in order to be connected to a hauling vehicle.

The hitherto known systems for transporting containers whether these are provided with temporarily affixed rolling means or located on low open-sided wagons, so called roll trailers, are, however, impaired by serious disadvantages, particularly in the form of bad manoeuvrability upon transportation in narrow spaces, e.g. on ships, due to large turning radii. The known systems are also in many cases comperatively complicated and time-consuming to use and often so specialized that they cannot be used for transportation of containers provided with separately affixed rolling means as well as containers placed on so called roll trailers.

The object of the present invention is therefore to provide a hauling vehicle which above all can be used for transporting containers and which gives a very good manoeuvrability and which, moreover, very easily can be adapted to be used for transporting containers provided with separately affixed rolling means as well as containers located on so called roll trailers and for hauling trailers designed for connection to hauling vehicles provided with a turntable lifting device and principally for hauling any trailer provided with wheels only at its rear part.

The hauling vehicle according to the invention has front wheels and rear wheels suspended from a frame, and connecting means at the rear end of the vehicle for connecting the vehicle to an object to be hauled, and is mainly characterized in that said connecting means are attached to the frame of the vehicle and designed to provide a substantially rigid interconnection between the frame of the vehicle and the object to be hauled, that means are provided for adjusting the vertical position of the vehicle frame relative to the rear wheels, that these rear wheels are steerably and drivably connected to the driving means of the vehicle and that the distribution of the weight of the vehicle on the front wheels and the rear wheels, respectively, is so adapted to the weight of the object to be hauled that after interconnecting the vehicle and the object by means of said connecting means the front wheels can be lifted up by raising the vehicle frame relative to the rear wheels.

A hauling vehicle designed in accordance with the invention can very easily and quickly be connected to and disconnected from, respectively, the object to be hauled whether this is a container, a so called roll trailer loaded with containers, a conventional trailer for connection to a turntable or any other type of trailer. The equipage then obtained has as short a wheel base as the design of the hauled object on the whole allows and the steerable wheels of the equipage are located very close to the front end of the hauled object, e.g. the container, which makes the equipage very easy to manoeuvre also in narrow spaces. It is also easy to design the hauling vehicle according to the invention in such a manner that the steerable wheels of the equipage can be turned within very large steering angles up to almost ±90° which further increases the manoeuvrability. When the hauling vehicle according to the invention is driven without being connected to any hauled object, the vehicle is as easy to manoeuvre as any conventional terminal tractor.

Figure 8:
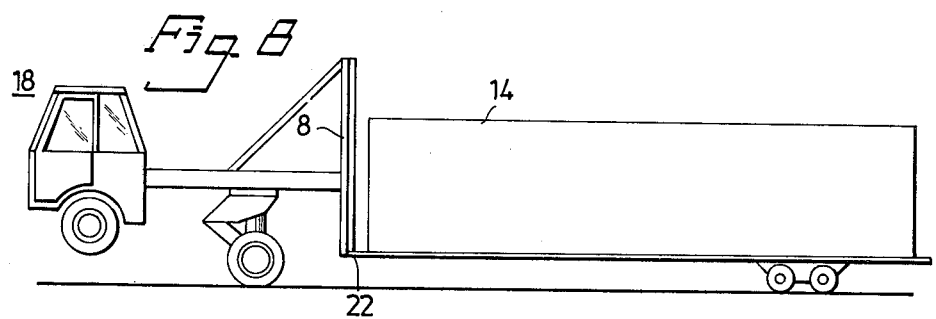
Figure 9:
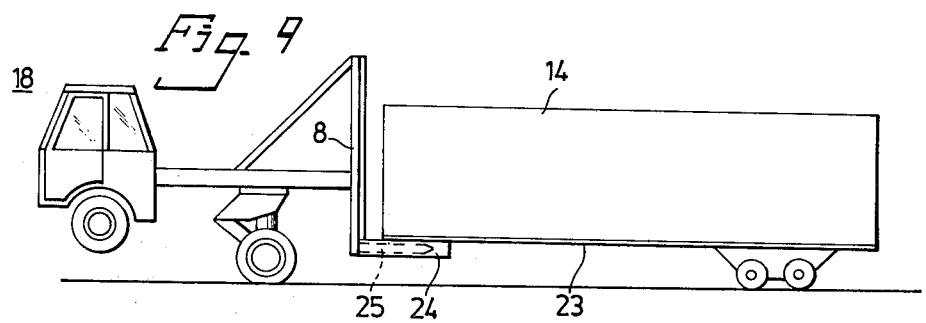
Figure 10:
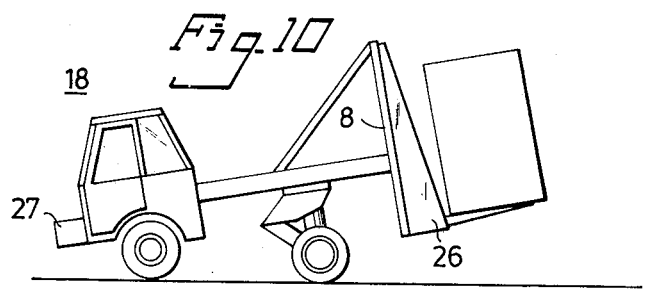

The invention will be described more in detail below with reference to the attached drawings on which FIG. 1 is a schematical sideview of an embodiment of a vehicle according to the invention designed mainly for transporting containers, FIG. 2 shows the vehicle according to FIG. 1 from the front, FIG. 3 shows the vehicle according to FIG. 1 from above, FIG. 4 schematically shows a section along the line IV—IV in FIG. 1 through the rear axle system of the vehicle, FIG. 5 is a schematical sideview showing how a hauling vehicle of fundamentally the design shown in FIGS. 1–4, is connected to a container resting directly on the ground or something equivalent, FIG. 6 is a sideview corresponding to FIG. 5 but showing the equipage in raised transport position, FIG. 7 is a schematical sideview illustrating how a hauling vehicle according to the invention can be used for transporting conventional trailers designed for connection to a turntable, FIG. 8 is a schematical sideview illustrating how a hauling vehicle according to the invention can be used for transporting a first type of low-loading trailers, so called roll trailers, for containers, FIG. 9 is a schematical sideview illustrating how a hauling vehicle according to the invention can be used for transporting a type of roll trailer which is intended to be connected via a swan-neck device to a hauling vehicle provided with a turntable lifting device, and FIG. 10 is a schematical sideview illustrating how a hauling vehicle according to the invention can be provided with a goods-handling fork to be used in the same manner as a fork truck.

The embodiment of the hauling vehicle according to the invention, shown schematically in FIGS. 1–4, is first of all intended and designed for transporting containers as will be described more in detail with reference to FIGS. 5 and 6. The vehicle has a rigid frame 1 which carries a driver's cab 2 and a driving motor unit 3 (not shown in detail). The vehicle is two-axled with a front axle 4 with associated front wheels 5 and a rear axle 6 with associated rear wheels 7. At the rear end of the vehicle frame 1 there is a connecting device 8 affixed to the frame for connecting the vehicle to the object to be hauled or transported i.e. preferably a container in the embodiment shown. The connecting device 8 should be designed to provide an essentially rigid interconnection between the vehicle frame 1 and the object to be hauled or transported, and comprises in the shown embodiment an essentially vertical rectangular frame which has the same dimensions as the gable-end of the containers to be transported by the hauling vehicle, and which at its corners are provided with suitably designed and in the shown embodiment hydraulically operable locking means 9 which can be brought into engagement with corner mountings at the gable-end of a container so that the connecting frame 8 and, thereby, the vehicle frame 1 is interconnected with the container as will be described more in detail with reference to FIGS. 5 and 6.

As opposed to what normally is the case in vehicles the front axle 4 with the front wheels is rigidly, i.e. not steerably, united with the vehicle frame 1. That the front axle 4 with the front wheels 5 is "rigidly" united with the vehicle frame 1 does, of course, not exclude that there are suitable spring means between the vehicle frame 1 and the front axle 4. Neither are the front wheels 5 drivable from the driving motor unit 3 of the vehicle.

The rear wheels 7 on the rear axle 6 are, however, drivable from the driving motor unit 3 as well as steerable, and, moreover, the rear axle 6 with the rear wheels 7 is connected to the vehicle frame 1 by means of power producing means which enable an adjustment of the vertical position of the vehicle frame 1 relative to the rear axle 6 with the rear wheels 7.

In the embodiment of the vehicle according to the invention shown on the drawing this is accomplished in the manner schematically illustrated in FIG. 4 in that the rear wheels 7 are directly mounted on hydraulic motors 10 arranged on the rear axle 6 which in turn is suspended from the vehicle frame 1 by means of an articulated leg 11 (compare FIG. 1) and a hydraulic cylinder 12 by means of which the distance between the vehicle frame 1 and the rear axle 6, thus, can be adjusted. The hydraulic motors 10 for driving the rear wheels 7 are in a manner known per se connected to a suitably designed hydraulic pump known per se with associated control equipment included within the driving motor unit 3 of the vehicle. The whole rear axle system with the articulated leg 11, the hydraulic cylinder 12, the axle 6, the driving motors 10 and the wheels 7 can for steering the vehicle be turned about a vertical axis in that the articulated leg 11 is rotatably mounted in the vehicle frame 1 and connected to a suitable preferably hydraulic steering mechanism 13. By this design of the rear axle system it is attained that the steering wheels 7 of the vehicle can be turned within a very large steering angle, up to about ±90°, which makes the vehicle very easy to manoeuvre also in narrow spaces.

FIGS. 5 and 6 illustrate how a hauling vehicle according to the invention can be used for transporting a container. FIG. 5 shows a container 14 resting directly on a support i.e. in the position that the container assumes upon connection and disconnection, respectively, of the hauling vehicle according to the invention. For connecting the hauling vehicle it is moved backwards to such a position at one gable-end of the container 14 that the connecting means 9 on the connecting frame 8 at the rear end of the vehicle frame 1 can be locked to the corner mountings on the gable-end of the container 14 so that an essentially rigid interconnection is obtained between the container 14 and the vehicle frame 1. Since the distance between the vehicle frame 1 and the rear axle 6 of the vehicle can be adjusted in the manner described above, the connecting frame 8 can be lowered far enough for interconnection with the container 14. In the embodiment shown, the connecting frame 8 is shown rigidly united with the vehicle frame 1 for sake of simplicity. A certain limited pivotability for the connecting frame 8 relative to the vehicle frame 1, at first hand about a horizontal axis, can, however, be suitable or even necessary for facilitating the interconnection between the connecting frame 8 and the container 14 by means of the connecting means 9. After that this interconnection has been accomplished the connecting frame 8 is suitably rigidly locked to the vehicle frame 1.

Moreover, to the rear end of the container 14 suitable wheel or roll means 15 are connected, which can be of any previously known type and which are provided with hydraulically hinged wheels. The hydraulic control means for these roll or wheel means 15 can advantageously be supplied with hydraulic fluid and be controlled from the hydraulic system of the hauling vehicle in that the roll means 15 are connected to a hydraulic hose 16 which is removable from a hose reel 17 on the hauling vehicle.

After that the hauling vehicle according to the invention has been connected to one gable-end of the container 14 and the roll means 15 locked to the other gable-end of the container 14 the vehicle frame 1 is raised in the above described manner relative to the vehicle rear axle 6 and the rear wheels 7 at the same time as the wheels of the roll means 15 are lowered in a manner known per se. Hereby the container 14 will be lifted from the support to the transport position schematically shown in FIG. 6 together with the vehicle frame 1 interconnected with the container 14. This means that also the vehicle front axle 4 with the front wheels 5 is lifted up from the support and an equipage is obtained, which have the rear axle 6 with the rear wheels 7 of the hauling vehicle as front axle with drivable and steerable front wheels, and the roll means 15 as non-steerable rear wheels. It is obvious that this equipage has a wheel base which is as short as practically possible in view of the length of the container 14, and is very easy to manoeuvre also in narrow spaces in that the steerable wheels 7 can be turned within a very large steering angle and, moreover, are located very close to the front end of the container 14.

It is also obvious that the connection and disconnection of the hauling vehicle from the container 14 can be carried out in a comparatively fast and simple manner. The only manual work required is to affix and remove, respectively, the roll means 15 at the rear end of the container 14. When transporting the hauling vehicle alone between different containers the roll means 15 can be hung on the hauling vehicle.

Upon idle running of the hauling vehicle it is appreciated that the steering takes place by means of the rear wheels of the vehicle, while upon hauling a container the stearing of the thus formed equipage is carried out with what in reality is the front wheels of the equipage which gives the opposite steering geometry for the equipage. Necessary consideration hereto can be taken by a reversal of the function of the steering wheel in the driver's cab of the hauling vehicle so that turning of the steering wheel in a certain direction always results in the same change of direction for the travel of the vehicle independent of whether the vehicle is driven alone in the position shown in FIG. 1 or interconnected with a container in the position shown in FIG. 6.

Since the front axle 4 and the front wheels 5 of the hauling vehicle only are used when driving the vehicle alone, the front axle and the front wheels do not have to be dimensioned for more than the tare weight of the hauling vehicle. The rear axle 6 and the rear wheels 7, however, have to be dimensioned with respect to the weight of the containers to be hauled by means of the vehicle.

FIG. 7 schematically illustrates how a hauling vehicle according to the invention can be used for hauling conventional trailers designed for connection to hauling vehicles provided with a turntable. For this purpose the connecting frame 8 of the hauling vehicle according to the invention, generally denoted 18, is rigidly interconnected with the front end of a short single-axled trailer 19 specially designed for this interconnection and which is provided with a turntable lifting device 20 of conventional type for connecting the trailer 21 to be hauled and transported. After having interconnected the hauling vehicle 18 according to the invention with the trailer 19 the frame of the hauling vehicle is raised in the manner described above so that the front axle 4 and the front wheels 5 of the hauling vehicle are lifted from the support and the equipage can be steered and driven by means of the rear wheels 7 of the hauling vehicle 18.

FIG. 8 schematically illustrates how the hauling vehicle 18 according to the invention can be used for hauling and transporting a low-loading roll trailer 22 which carries a container 14 or some other load. This roll trailer has a special front portion for interconnection with the connecting frame 8 of the hauling vehicle.

In a corresponding manner FIG. 9 shows how a hauling vehicle 18 according to the invention can be used for hauling and transporting a low-loading roll trailer 28 for e.g. containers 14, which roll trailer at its front end is provided with a connecting box 24 for interconnection with a swan-neck device 25 which is rigidly interconnected with the connecting frame 8 of the hauling vehicle 18 according to the invention.

It is appreciated that a hauling vehicle according to the invention principally can be used for hauling or transporting any kind of trailer which has a supporting wheel axle only close to its rear end while its front end is designed to be rigidly interconnected with the connecting means at the rear end of the hauling vehicle according to the invention.

It is also appreciated that for all the purposes described above the hauling vehicle according to the invention must have a weight distribution between the front axle and the rear axle which is so adapted relative to the weight of the object to be hauled or transported that the front axle with the front wheels of the hauling vehicle is lifted up from the support when the vehicle is rigidly interconnected with the object to be hauled and the frame of the vehicle is raised relative to the rear axle in the manner described above.

However, a vehicle according to the invention can also be used as a conventional fork truck for handling goods in that in the manner schematically illustrated in FIG. 10 a fork device 26, which can either be stationary or designed as a lifting fork, is affixed to the connecting frame 8 of the vehicle 18. In this case a counter-weight 27 should be mounted on the front portion of the vehicle so that the vehicle does not turn over under influence of the load on the fork device 26.

I claim:

1. A drive vehicle for hauling a movable object, comprising a rigid chassis, front wheels normally supporting the front of the chassis, steerable rear wheels beneath the back of the chassis, driving means for the rear wheels, connecting means secured to the rear end of said vehicle chassis to provide a substantially rigid interconnection between said chassis and the front end of a movable object, and vertically elevatable means supporting the chassis from said rear wheels, whereby when said vehicle is connected to said movable object and said elevatable means are extended vertically the chassis will lift said front wheels from the ground when the weight of the movable object is sufficient to counter-balance the weight of said chassis forward of the rear wheels.

2. A vehicle according to claim 1, wherein the rear wheels are mounted on a rear axle which is turnable about a vertical axis relative to the vehicle frame for steering the vehicle, and the rear wheels are drivable by means of driving motors mounted on the rear axle.

3. A vehicle according to claim 2, wherein said driving motors are hydraulic motors.

4. A vehicle according to claim 1, wherein said connecting means comprise a substantially vertical rectangular frame attached to the rear end of the vehicle chassis, and at corners of which there are provided connecting elements adapted to cooperate with connecting elements provided at the corners of a container to be hauled.

5. A vehicle according to claim 4, wherein said connecting elements are hydraulically actuated transversely of said chassis.

6. A vehicle according to claim 1 or 2, wherein said connecting means are adapted to be rigidly interconnected with the front end of the frame of a short single-axled trailer provided with a turntable lifting device for interconnection with trailers designed for hauling vehicles having a turntable.

* * * * *